United States Patent
Vetro et al.

(10) Patent No.: US 7,620,818 B2
(45) Date of Patent: Nov. 17, 2009

(54) BIOMETRIC BASED USER AUTHENTICATION AND DATA ENCRYPTION

(75) Inventors: Anthony Vetro, Arlington, MA (US); Jonathan S. Yedidia, Cambridge, MA (US); Emin Martinian, Arlington, MA (US); Sergey M. Yekhanin, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 911 days.

(21) Appl. No.: 11/218,261

(22) Filed: Sep. 1, 2005

(65) Prior Publication Data

US 2006/0123241 A1 Jun. 8, 2006

Related U.S. Application Data

(63) Continuation-in-part of application No. 11/006,308, filed on Dec. 7, 2004, now abandoned.

(51) Int. Cl.
*G06F 9/46* (2006.01)
*G06F 21/00* (2006.01)

(52) U.S. Cl. .................. 713/186; 382/115

(58) Field of Classification Search ............. 713/161, 713/168, 182, 186; 726/2–5, 16–18, 26–30; 380/28–30; 382/115–118, 124–127; 340/5.52, 340/5.53
See application file for complete search history.

(56) References Cited

U.S. PATENT DOCUMENTS

| | | | | |
|---|---|---|---|---|
| 6,038,315 A | * | 3/2000 | Strait et al. | 713/183 |
| 7,391,890 B2 | * | 6/2008 | Kaleedhass | 382/115 |
| 2003/0097559 A1 | * | 5/2003 | Shimizu et al. | 713/155 |
| 2004/0049685 A1 | * | 3/2004 | Jaloveczki | 713/182 |
| 2004/0158815 A1 | * | 8/2004 | Potgieter | 717/120 |
| 2005/0058324 A1 | * | 3/2005 | Karthik | 382/115 |
| 2006/0075233 A1 | * | 4/2006 | Turner et al. | 713/168 |
| 2006/0082439 A1 | * | 4/2006 | Bazakos et al. | 382/115 |
| 2006/0095963 A1 | * | 5/2006 | Crosby et al. | 726/22 |

FOREIGN PATENT DOCUMENTS

GB 2390705 1/2004

OTHER PUBLICATIONS

Slepian and Wolf in "Noiseless coding of correlated information sources," IEEE Transactions on Information Theory, vol. 19, pp. 471-480, Jul. 1973.

Pradhan and Ramchandran described a practical implementation of such codes in "Distributed Source Coding Using Syndromes (DISCUS): Design and Construction," IEEE Transactions on Information Theory, vol. 49, pp. 626-643, Mar. 2003.

(Continued)

*Primary Examiner*—Gilberto Barron, Jr.
*Assistant Examiner*—Abdulhakim Nobahar
(74) *Attorney, Agent, or Firm*—Dirk Brinkman; Gene Vinokur

(57) ABSTRACT

First biometric parameters are acquired from a user. Input data are encrypted according to the biometric parameters to produce ciphertext. The biometric parameters are encoded using a syndrome encoder to produce a syndrome code. The ciphertext and the syndrome code are associated with each other and stored in a computer readable media so that only the same user can subsequently decrypt the cipher text.

14 Claims, 12 Drawing Sheets

OTHER PUBLICATIONS

"On some new approaches to practical Slepian-Wolf compression inspired by channel coding" by Coleman et al., in Proceedings of the Data Compression Conference, Mar. 2004, pp. 282-291.

"On enabling secure applications through off-line biometric identification," by Davida, G.I., Frankel, Y., Matt, B.J. in Proceedings of the IEEE Symposium on Security and Privacy, May 1998.

"A Fuzzy Vault Scheme," by Juels, A., Sudan, M., in Proceedings of the 2002 IEEE International Symposium on Information Theory, Jun. 2002.

Ron Rivest in "The MD5 Message Digest Algorithm," RFC 1321, Apr. 1992.

J. Li, K.R. Narayanan, and C.N. Georghiades, "Product Accumulate Codes: A Class of Codes With Near-Capacity Performance and Low Decoding Complexity," IEEE Transactions on Information Theory, vol. 50, pp. 31-46, Jan. 2004.

D. Divsalar and S. Dolinar, "Concatenation of Hamming Codes and Accumulator Codes with High Order Modulation for High Speed Decoding," IPN Progress Report 42-156, Jet Propulsion Laboratory, Feb. 15, 2004.

"Design of capacity-approaching irregular low-density parity-check codes" by T. J. Richardson, M. A. Shokrollahi, and R. L. Urbanke in the *IEEE Transactions on Information Theory*, vol. 47, Issue 2, Feb. 2001 pp. 619-637.

"Factor graphs and the sum-product algorithm," by F. R. Kschischang, B. J. Frey, and H.-A. Loeliger, in *IEEE* Transactions on Information Theory, vol. 47, Issue 2, Feb. 2001, pp. 498-519.

"How iris recognition works," by J. Daugman in IEEE Transactions on Circuits and Systems for Video Technology, vol. 14, Issue 1, Jan. 2004 pp. 21-30.

V. K. Goyal, "Multiple description coding: compression meets the network," IEEE Signal Processing Magazine, vol. 18, pp. 74-93, Sep. 2001.

Effros "Distortion-rate bounds for fixed- and variable-rate multiresolution source codes," IEEE Transactions on Information Theory, vol. 45, pp. 1887-1910, Sep. 1999.

Steinberg and Merhav, "On successive refinement for the Wyner-Ziv problem," IEEE Transactions on Information Theory, vol. 50, pp. 1636-1654, Aug. 2004.

Doodis et al.: "Fuzzy extractors : how to generate strong keys from biomentric and other noisy data," 2004.

* cited by examiner

700

1100

BIOMETRIC BASED USER AUTHENTICATION AND DATA ENCRYPTION

RELATED APPLICATION

This is a Continuation-in-Part Application of U.S. patent application Ser. No. 11/006,308, MERL-1643, "Biometric Based User Authentication with Syndrome Codes," filed by Martinian et al. on Dec. 7, 2004 now abandoned.

FIELD OF THE INVENTION

The invention relates generally to the fields of cryptography, and more particularly to storing biometric parameters for user authentication and data encryption.

BACKGROUND OF THE INVENTION

Conventional Password Based Security Systems

Conventional password based security systems typically include two phases. Specifically, during an enrollment phase, users select passwords which are stored on an authentication device such as server. To gain access to resources or data during an authentication phase, the users enter their passwords which are verified against the stored versions of the passwords. If the passwords are stored as plain text, then an adversary who gains access to the system could obtain every password. Thus, even a single successful attack can compromise the security of the entire system.

As shown in FIG. 1, a conventional password based security system 100 stores 115 encrypted 110 passwords 101 in a password database 120 during an enrollment phase 10. As defined herein, the database can be stored in any memory or other computer readable media, tape, flash memory, RAM, ROM, disk, and the like.

Specifically, if X is password 101 to be stored 115, the system 100 actually stores $f(X)$ where $f(.)$ is some encryption or hash function 110. During an authentication phase 20, a user enters a candidate password Y 102, the system determines 130 $f(Y)$, and only grants access 150 to the system when $f(Y)$ matches 140 the stored password $f(X)$, otherwise access is denied 160.

As an advantage, encrypted passwords are useless to an adversary without the encryption functions, which are usually very difficult to invert.

Conventional Biometric Based Security Systems

A conventional biometric security system has the same vulnerability as a password based system which stores unencrypted passwords. Specifically, if the database stores unencrypted biometric parameters, then the parameters are subject to attack and misuse.

For example, in a security system using a face recognition system or voice recognition, an adversary could search for biometric parameters similar to the adversary. After suitable biometric parameters are located, the adversary could modify the parameters to match the appearance or voice of the adversary to gain unauthorized access. Similarly, in a security system using fingerprint or iris recognition, the adversary could construct a device that imitates a matching fingerprint or iris to gain unauthorized access, e.g., the device is a fake finger or fake eye.

It is not always possible to encrypt biometric parameters due to their inherent variability over time. Specifically, biometric parameters X are entered during the enrollment phase. The parameters X are encrypted using an encryption or hashing function $f(X)$, and stored. During the authentication phase, the biometric parameters obtained from the same user can be different. For example, in a security system using face recognition, the user's face can have a different orientation with respect to the camera during enrollment than during authentication. Skin tone, hairstyle and facial features can change. Thus, during authentication, the encrypted biometric parameters will not match with any stored parameters causing rejection.

Error Correcting Codes

An (N, K) error correcting code (ECC)C, over an alphabet Q, includes $Q^K$ vectors of length N. A linear (N, K) ECC can be described either by using a generator matrix G with N rows and K columns, or by using a parity check matrix H with N-K rows and N columns. The name 'generator matrix' is based on the fact that a codeword expressed as a vector w, can be generated from any length K input row vector v by right multiplying the vector v by the matrix G according to w=vG. Similarly, to check if the vector w is a codeword, one can check whether $Hw^T=0$, where a column vector $w^T$ is a transpose of the row w.

In the standard use of error correcting codes, an input vector v is encoded into the vector w, and either stored or transmitted. If a corrupted version of the vector w is received, a decoder uses redundancy in the code to correct for errors. Intuitively, the error capability of the code depends on the amount of redundancy in the code.

Slepian-Wolf, Wyner-Ziv, and Syndrome Codes

In some sense, a Slepian-Wolf (SW) code is the opposite of an error correcting code. While an error correcting code adds redundancy and expands the data, the SW code removes redundancy and compresses the data. Specifically, vectors x and y represent vectors of correlated data. If an encoder desires to communicate the vector x to a decoder that already has the vector y, then the encoder can compress the data to take into account the fact that the decoder has the vector y.

For an extreme example, if the vectors x and y are different by only one bit, then the encoder can achieve compression by simply describing the vector x, and the location of the difference. Of course, more sophisticated codes are required for more realistic correlation models.

The basic theory of SW coding, as well as the related Wyner-Ziv (WZ) coding, are described by Slepian and Wolf in "Noiseless coding of correlated information sources," IEEE Transactions on Information Theory, vol. 19, pp. 471-480, Jul. 1973, and Wyner and Ziv in "The rate-distortion function for source coding with side information at the decoder," IEEE Transactions on Information Theory, vol. 22, pp. 1-10, Jan 1976. More recently, Pradhan and Ramachandran described a practical implementation of such codes in "Distributed Source Coding Using Syndromes (DISCUS): Design and Construction," IEEE Transactions on Information Theory, vol. 49, pp. 626-643, Mar. 2003.

Essentially, the syndrome codes work by using a parity check matrix H with N-K rows and N columns. To compress a binary vector x of length N to a syndrome vector of length K, determine S=Hx. Decoding often depends on details of the particular syndrome code used. For example, if the syndrome code is trellis based, then various dynamic programming based search algorithms such as the well known Viterbi algorithm can be used to find the mostly likely source sequence x corresponding to the syndrome S and a sequence of side information as described by Pradhan et al.

Alternatively, if low density parity check syndrome codes are used, then belief propagation decoding can be applied as described in "On some new approaches to practical Slepian- Wolf compression inspired by channel coding" by Coleman et al., in Proceedings of the Data Compression Conference, Mar. 2004, pp. 282-291.

PRIOR ART

Prior art related to the current invention falls into three categories. First, there is a great deal of prior art describing the detailed feature extraction, recording, and use of biometric parameters unrelated to the secure storage of such biometric parameters. Because our invention is concerned with secure storage, and largely independent of the details of how the biometric parameters are acquired, details of this category of prior art are omitted.

The second class of prior art, which is relevant to the invention, includes the following systems designed for secure storage and authentication of biometrics: "Method and system for normalizing biometric variations to authenticate users from a public database and that ensures individual biometric data privacy," U.S. Pat. No. 6,038,315; "On enabling secure applications through off-line biometric identification," by Davida et al. in Proceedings of the IEEE Symposium on Security and Privacy, May 1998; "A Fuzzy Vault Scheme," by Juels et al. in Proceedings of the 2002 IEEE International Symposium on Information Theory, Jun. 2002; and "Multi-factor biometric authenticating device and method," U.S. Pat. No. 6,363,485.

FIG. 2 shows some of the details of the basic method described in U.S. Pat. No. 6,038,315. In the enrollment phase 210, biometric parameters are acquired in the form of a sequence of bits denoted E 201. Next, a random codeword W 202 is selected from a binary error correcting code and additively combined with the parameters E using an exclusive OR (XOR) function 220 to produce a reference R 221. Optionally, the reference R can be further encoded 230. In any case, the reference R is stored in a password database 240.

In the authentication phase 215, biometric parameters E' 205 are presented for authentication. The method determines 250 the XOR of R with E' by essentially subtracting E' from R to obtain $Z=R-E'=W+E-E'$ 251. This result is then decoded 260 with the error correcting code to produce W' 261. In step 270, if W' matches W, then access is granted 271, and otherwise, access is denied 272.

That method essentially measures the Hamming distance, i.e., the number of bits that are different, between the enrolled biometric E 201 and the authentication biometric E' 205. If the difference is less than some predetermined threshold, then access is granted. Because the method stores only the reference R, and not the actual biometric parameters E, the method is secure.

Davida et al. and Juels et al. describe variations of the method shown in FIG. 2. Specifically, both encode the biometric data with an error correcting code during the enrollment phase followed by an operation to secure the resulting codeword. Davida et al. hide the codeword by only sending the check bits, while Juels et al. add some amount of noise referred to as 'chaff'.

U.S. Pat. No. 6,363,485 describes a method for combining biometric data with an error correcting code and some secret information, such as a password or personal identification number (PIN) to generate a secret key. Error correcting codes, such as Goppa codes or BCH codes, are employed with various XOR operations.

In addition to fixed database access control systems illustrated in FIG. 2, a third class of prior art includes using biometrics for data protection, specifically data protection for mobile devices that include memory, such as laptops, PDAs, cellular telephones and digital cameras. Because mobile devices are easily lost or stolen, it becomes necessary to protect data stored in mobile devices.

FIG. 4 illustrates the problem with existing approaches for storing data D 401. In an encoding process 410, biometric parameters P 402 are obtained from a user and used as a key to encrypt 440 data D to produce the ciphertext C 441. Both P and C are saved in storage 450. When a user wishes to decode 420 the data 401, biometric parameters P' 460 are obtained from a user and compared 465 to the stored biometric P 402. If P' matches 470 P, then the system allows access and uses P to decrypt 480 the stored ciphertext C 441 to produce the data D 401, otherwise the data are not decrypted 471.

Such a prior art system is only effective as long as the storage medium is not compromised. If an adversary can access such media, then the adversary obtains P and decodes the data.

Problems with the Prior Art

First, the bit-based prior art method provides dubious security. In addition, biometric parameters are often real-valued or integer-valued, instead of binary valued. The prior art assumes generally that biometric parameters are composed of uniformly distributed random bits, and that it is difficult to determine these bits exactly from the stored biometric. In practice, biometric parameters are often biased, which negatively affect security. Also, an attack can cause significant harm, even if the adversary recovers only an approximate version of the stored biometric. Prior art methods are not designed to prevent the adversary from estimating the actual biometric from the encoded version.

For example, U.S. Pat. No. 6,038,315 relies on the fact that the reference value $R=W+E$ effectively encrypts the biometric E by adding the random codeword W. However, that method achieves poor security. There are a number of ways to recover E from R. For example, if the vector E has only a few bits equal to one, then the Hamming distance between R and W is small. Thus, an error correction decoder could easily recover W from R, and hence also recover E. Alternatively, if the distribution of codewords is poor, e.g., if the weight spectrum of the code is small and many codewords are clustered around the all zero vector, then an adversary could obtain a good approximation of E from R.

Second, in addition to dubious security, prior art methods have the practical disadvantage of increasing the amount of data stored. Because biometric databases often store data for many individual users, the additional storage significantly increases the cost and complexity of the system.

Third, many prior art methods require error correction codes or algorithms with a high computational complexity. For example, the Reed-Solomon and Reed-Muller decoding algorithms of the prior art generally have a computational complexity which is at least quadratic and often higher in the length of the encoded biometric.

Fourth, there are fundamental problems with the basic architecture for the mobile security systems known in the prior art. Mobile security systems such as the one shown in FIG. 4 can only be effective if the mobile security system itself is not compromised. Returning to the example of a mobile security system on a laptop, the security can only be effective if an adversary cannot physically access the media where P and C are stored. If an adversary can access such media, e.g., by removing the hard disk from the laptop, then the adversary immediately obtains P which was the encryption key used to generate C and therefore decrypt C.

The main difficulty with prior mobile security systems is that the encryption key corresponding to the user's biometric parameters are stored in the device. Thus, if the device is stolen, then the data can be decoded using the stored parameters.

Therefore, there is a need for a method of storing a biometric, as well as corresponding encrypted information, in such a way that even if an adversary gains access to both the encrypted information and the stored version of the biometric parameters, it is impossible to decode the data.

SUMMARY OF THE INVENTION

Biometric parameters, which are acquired from human faces, voices, fingerprints and irises for example, can be used are often used for user authentication and data access control. Biometric parameters cannot be stored in hashed or encrypted forms in databases as is done with passwords because the parameters are continuous and can vary from one reading to the next for the same user. For example, the appearance of a face, or tone of a voice can change slightly over time. If biometric parameters are stored in a database, then they become subject to "break once, run everywhere" attacks.

One embodiment of the invention uses syndrome codes to protect the biometric data, e.g., syndrome codes based on Wyner-Ziv or Slepian-Wolf coding. These syndrome codes can be stored securely in a database, while still tolerating the inherent variability of the raw biometric data.

Specifically, the biometric syndromes according to the invention have the following properties: First, the syndrome codes effectively hide or encrypt information about the original biometric characteristics so that if the syndrome database is compromised, the stored syndrome codes are of little use in circumventing the security of the system. Second, each stored syndrome code can be decoded to yield the original biometric parameters, and to authenticate a user or decrypt data that was encrypted with the biometric data.

The syndrome codes can be used for user authentication and data encryption.

DETAILED DESCRIPTION OF THE PREFERRED EMBODIMENT

Embodiments of our invention include the following components: a syndrome encoder and hashing method for securely storing biometric parameters, a syndrome code based encryption method for securely storing data encrypted with biometric keys, and a method of optimizing syndrome codes used for secure biometric applications such as the former two methods. We describe each method in a separate subsection.

A Syndrome and Hashing Method for Secure Biometric Parameters

Figure 1:
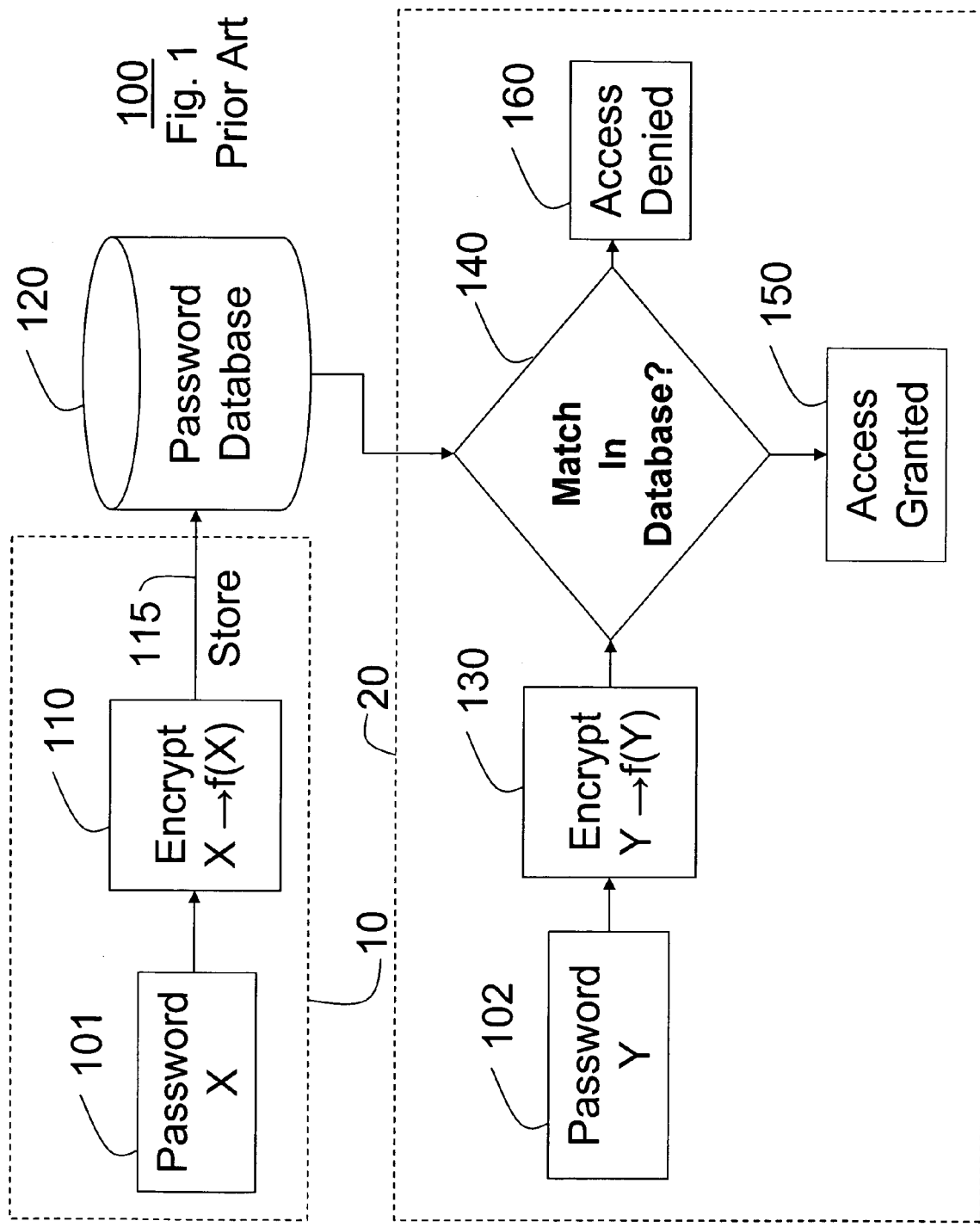
FIG. 1 is a block diagram of prior art password based security system.
Figure 2:
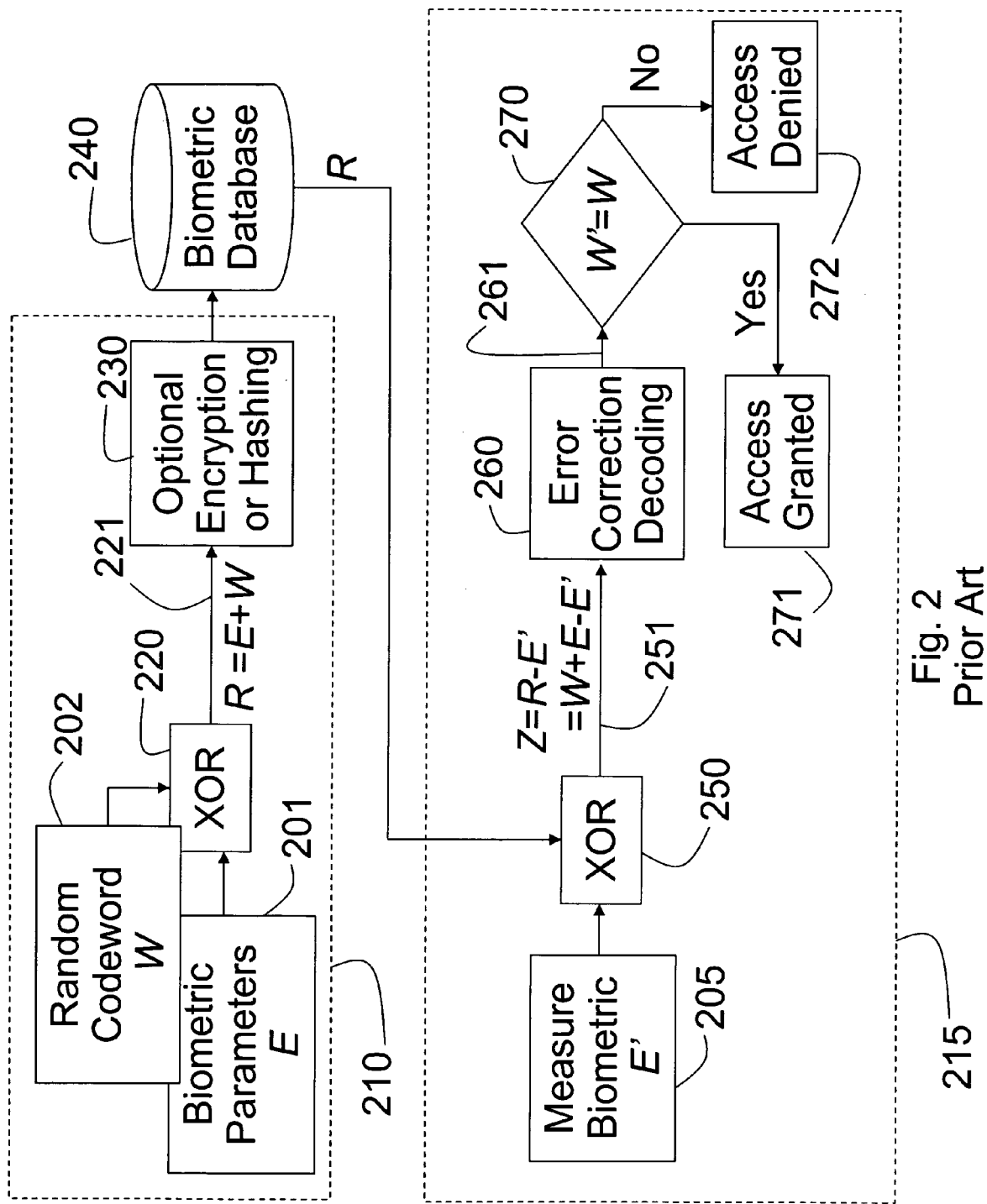
FIG. 2 is a block diagram of prior art biometric based security system.
Figure 3:
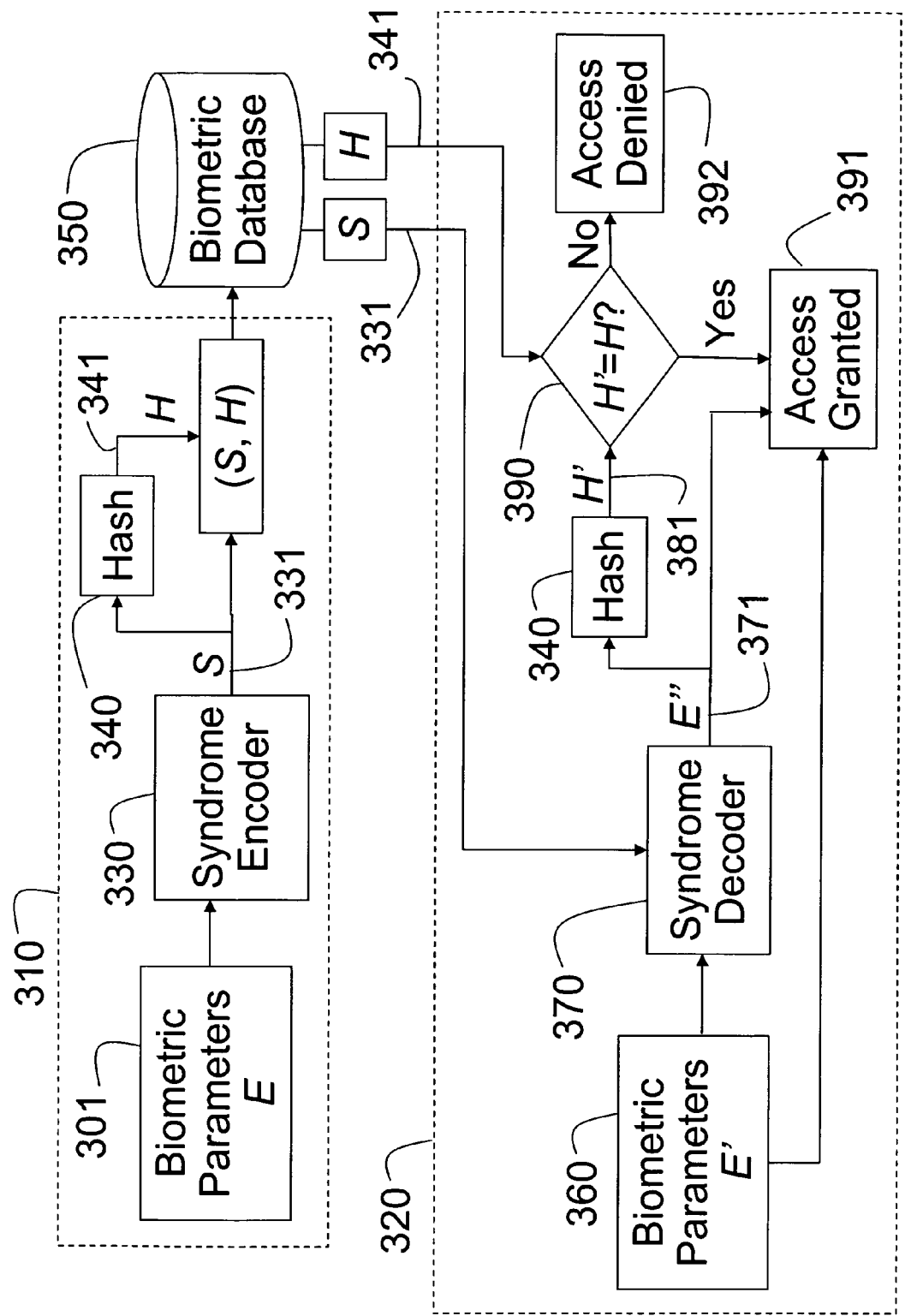
FIG. 3 is a block diagram of a biometric security system according to one embodiment of the invention.
Figure 4:
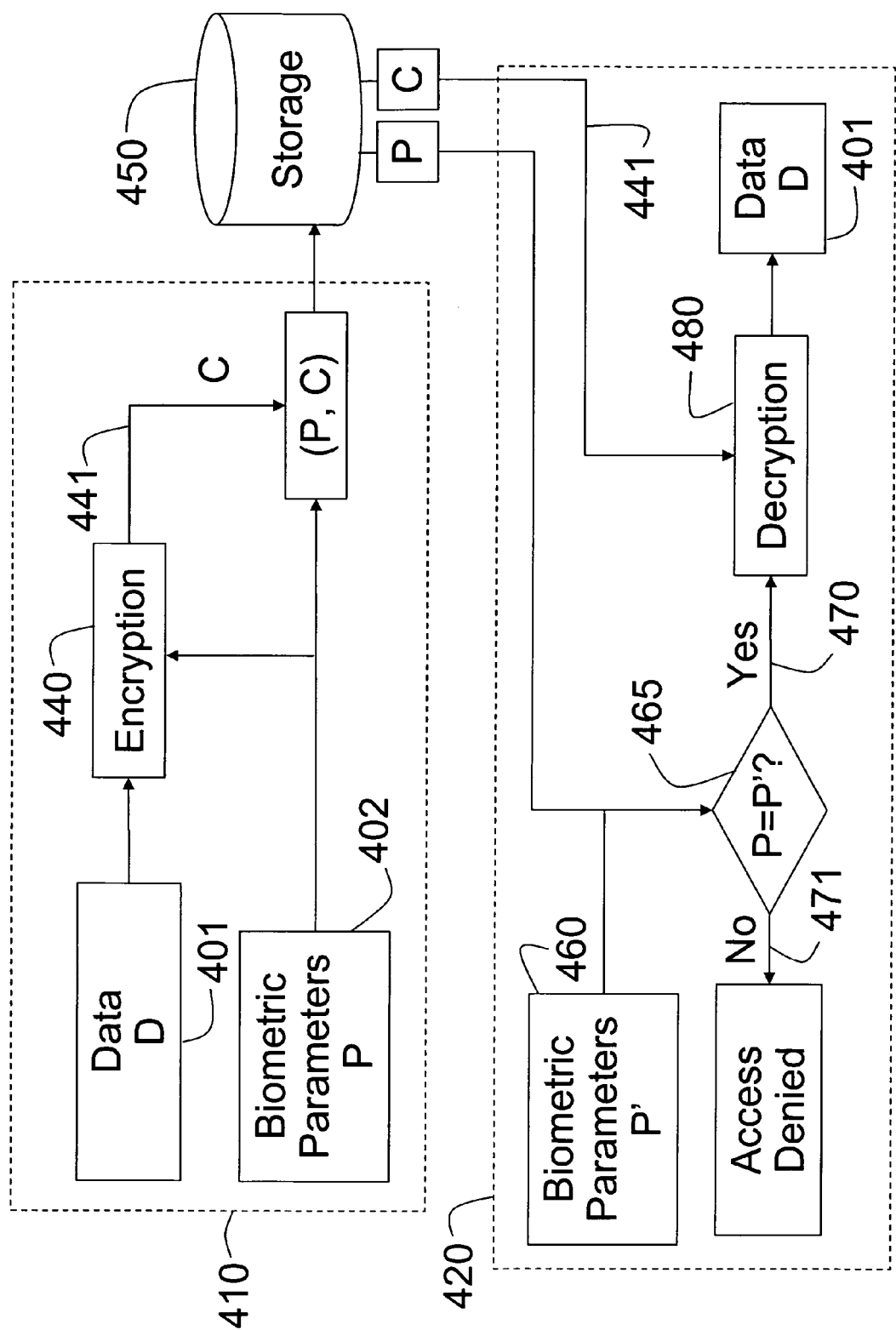
FIG. 4 is a block diagram of a prior art security system for protecting data.

FIG. 3 shows a syndrome and hashing based biometric security system 300 according to our invention. The method according to our invention compresses measured biometric parameters with a syndrome code to produce a compressed syndrome code. Unlike conventional compression, the syndrome code produced by the syndrome code bears no relationship to the original biometric data. Therefore, the stored syndrome code cannot be used to decode an approximation of the original biometric parameters. The resulting compressed syndrome code and a hash of the syndrome code are stored in a biometric database.

To authenticate a user, biometric parameters are measured again. The biometric parameters are combined with the stored syndrome code to decode the original biometric parameters. If syndrome decoding fails, the user is denied access. If syndrome decoding succeeds, then the original biometric parameters are used to verify the authenticity of the user.

Enrollment Phase

In an enrollment phase 310, biometric data are acquired of a user. For example, the biometric data is derived from an image of a face, a recording of speech, an image of a fingerprint, or a scan of an iris. Hereinafter, biometric data refers to the raw biometric signal sensed, measured or otherwise acquired from a user. Features are extracted from the biometric data. The features are arranged in a d-dimensional feature vector. The feature vector forms enrollment biometric parameters 301. Methods for extracting features from various forms of biometric data are well known in the art, as described above. Converting the feature vector to biometric parameters and an optimal syndrome code are described in greater detail below.

The biometric parameters E 301 are encoded using a syndrome encoder 330 to produce an enrollment syndrome code S 331. Next, a message authentication code or hash function is applied 340 to the enrollment syndrome code S to produce an enrollment hash H 341. The hash function can be the well-known MD5 cryptographic hash function described by Ron Rivest in "The MD5 Message Digest Algorithm," RFC 1321, Apr. 1992. The enrollment syndrome code hash pair (S, H) 331, 341 is stored in a biometric database 350.

Any type of syndrome code, e.g., the SW code or the WZ code described above, can be used. The preferred embodiment of the invention uses codes derived from so-called "repeat-accumulate codes," namely "product-accumulate codes," and codes that we call "extended Hamming-accumulate codes."

We refer generally to these as serially concatenated accumulate (SCA) codes. For more information on these classes of codes in a general sense, see J. Li, et al., "Product Accumulate Codes: A Class of Codes With Near-Capacity Performance and Low Decoding Complexity," IEEE Transactions on Information Theory, vol. 50, pp. 31-46, Jan. 2004; M. Isaka and M. Fossorier, "High Rate Serially Concatenated Coding with Extended Hamming Codes," submitted to IEEE Communications Letters, 2004; and D. Divsalar and S. Dolinar, "Concatenation of Hamming Codes and Accumulator Codes with High Order Modulation for High Speed Decoding," IPN Progress Report 42-156, Jet Propulsion Laboratory, Feb. 15, 2004.

U.S. patent application Ser. No. 10/928,448, "Compressing Signals Using Serially-Concatenated Accumulate Codes," filed by Yedidia, et al. on Aug. 27, 2004 and incorporated herein by reference, describes the operation of our preferred syndrome encoder based on SCA codes as used by the present invention.

Our syndrome encoder 330 for the biometric parameters 301 has a number of advantages. The syndrome encoder 330 can operate on integer-valued inputs. In contrast, prior art encoders generally operate on binary-valued inputs. The syndrome encoder has very high compression rates to minimize the storage requirements of the biometric database 350. The syndrome encoder is rate-adaptive, and can operate in an incremental fashion. More bits can be sent as necessary without wasting information in syndrome bits sent previously.

Authentication Phase

In an authentication phase 320, biometric data are again acquired from the user. Features are extracted to obtain authentication biometric parameters E' 360. The database 350 is searched to locate the matching enrollment syndrome code S 331 and enrollment hash H 341 for this user.

The search can check every entry (S-H pair) in the database 350, or a heuristically ordered search can be used to accelerate the process of finding a matching entry. Specifically, if we denote the $i^{th}$ syndrome code hash pair in the database as $(S_i, H_i)$, then an exhaustive search first applies syndrome decoding to E' and $S_1$ and compares the hash of the syndrome decoder output to $H_1$. If access is denied, the same process is attempted with $(S_2, H_2)$, then $(S_3, H_3)$, etc. until all entries have been tried or access was granted.

If side information such as an enrollment user name is available, then the side information can be used to accelerate the search. For example, the hash of the enrollment user name is stored with the S-H pair during the enrollment phase. Then, in the authentication phase, the user supplies an authentication user name, and the system determines the hash of the authentication user name, searches the database for an S-H pair with a matching hashed enrollment user name, and attempts to authenticate E' with the resulting S-H pair.

Specifically, a syndrome decoder 370 is applied to the enrollment syndrome S with the authentication parameters E' 360 acting as 'side' information. Syndrome decoders are known in the art generally. Typically, decoders that use belief propagation or turbo codes have excellent error resiliency with low complexity. An output of the syndrome decoder 370 is decoded enrollment parameters E" 371. The decoded value E" 371 is an estimate of the original biometric parameter E 301 used to produce the syndrome code S 331. The hash function 340 is applied to E" 371 to produce an authentication hash H' 381.

The enrollment and authentication values H 341 and H' 381 are compared 390. If the values do not match, then access is denied 392. Otherwise, the value E" 381 substantially matches the original biometric E 301. In this case, the user can be granted access 391.

In addition, a direct comparison can be made between the decoded parameters E" 381 and the authentication biometric parameters E' 360 to authenticate the user. For example, if E' and E" correspond to biometric parameters in a face recognition system, conventional algorithms for comparing the similarity between faces could be applied to the parameters E' and E".

Syndrome Based Data Encryption

Figure 5:
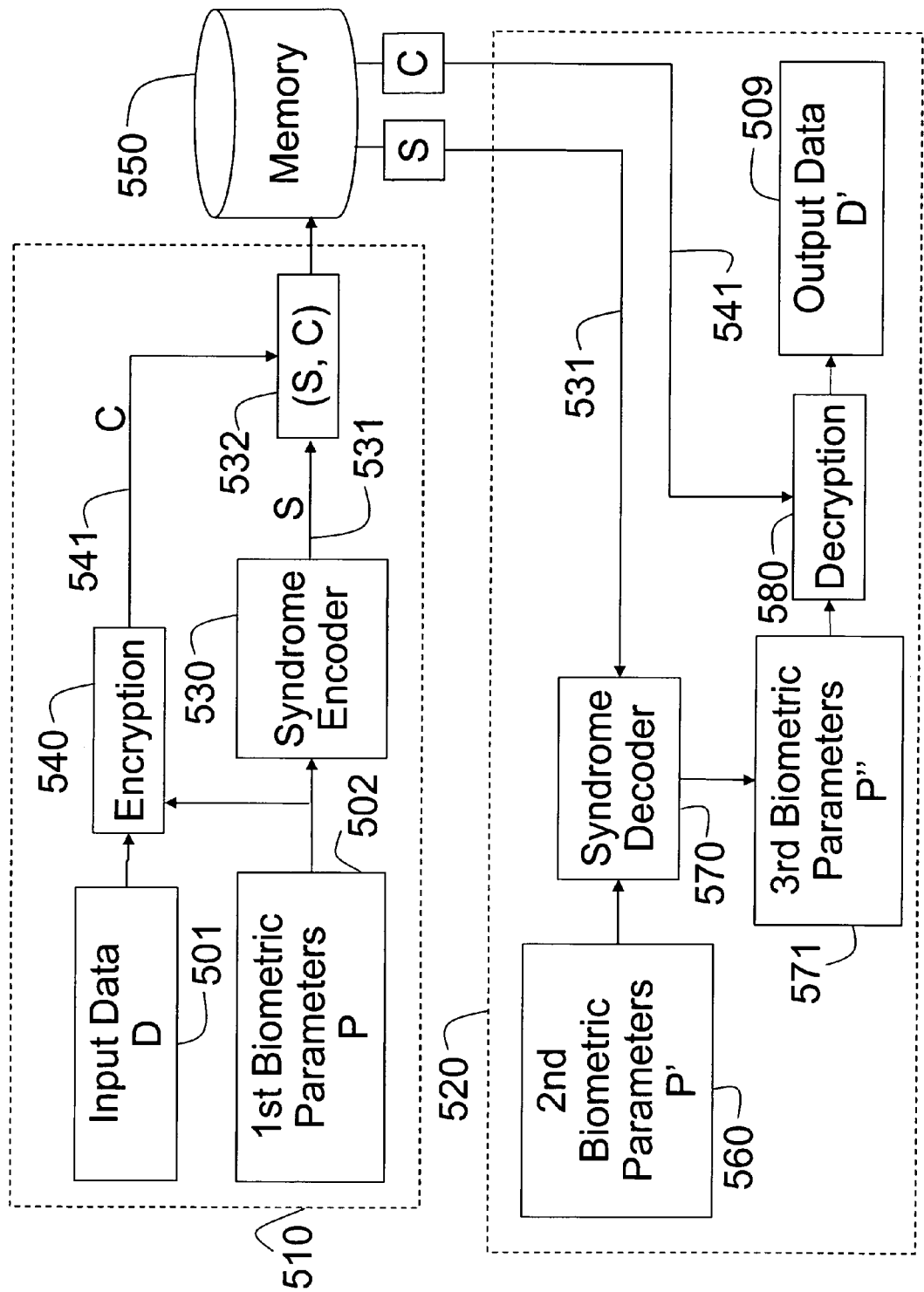
FIG. 5 is a block diagram of a data security system according to an embodiment of the invention.

FIG. 5 shows a method 500 for encoding 510 and decoding 520 data 501. In the encoding process 510, first biometric parameters P 502 are obtained from a first user. The parameters are used to encrypt 540 input data D 501 to produce the ciphertext C 541. In contrast to the prior art, however, the first biometric parameters P are never stored in a memory. Instead, a syndrome encoder 530 encodes the first biometric parameters P to produce a syndrome code S 531, S and C are associated with each other, and the pair (S, C) 532 is stored in a memory 550. In one embodiment of the invention, the input data are the raw biometric data acquired from a user during an enrollment process.

When a person wishes to decode 520 the ciphertext 541, second biometric parameters P' 560 are acquired from a second user. The stored syndrome code S 531 is syndrome decoded 570 using the second biometric parameters to produce third biometric parameters P'" 571. The third biometric parameters P'" are then used to decrypt 580 the ciphertext C 541 to produce output data D' 509. Obviously, if the second or third biometric parameters do not match the first biometric parameters, the output data D' 509 do not match the input data D 501. The output data will only match the input data exactly if the first user and the second user are the identical person.

The method has the following advantages. If an adversary gains access to the syndrome code and the ciphertext (S, C), the data cannot be decrypted. This is because the encryption key, i.e., the first biometric parameters P cannot be recovered from the syndrome code. In addition, because of error correcting properties of syndrome codes, even if the second biometric parameters P' differs slightly from the first biometric parameters P, a suitably designed syndrome decoder can successfully produce the third biometric parameters P'" that are exactly the same as the first biometric parameters used as the encryption key P 502.

Syndrome encoding provides an effective way to securely store biometric parameters, and can be applied to other methods of securely storing biometric information. It should be noted that feature vectors can be extracted from biometric data. Therefore, any of the above described biometric parameters can be replaced by a corresponding feature vector.

An additional advantage of storing the biometric parameters in an encrypted form is that this enables secure biometric storage applications to operate on different feature vectors than those used in biometric recognition applications. For example, fingerprint recognition systems often use a feature vector based on so-called 'minutiae' extracted from an image of a fingerprint. Similarly, iris recognition systems sometimes use features extracted from passing the iris image through a bank of Gabor filters.

In many cases, the ideal feature vector for biometric recognition, e.g., face recognition or fingerprint identification, can be different than the ideal feature vector for syndrome encoding/decoding. In many cases this is due to the fact that a process for training a classifier for a recognition or identification system, e.g., a classifier based on a Gaussian mixture model (GMM), neural networks or hidden Markov models, produce different feature vectors than a process used for training a histogram used with a belief propagation decoder of syndrome encoders and decoders as described herein.

Figure 6:
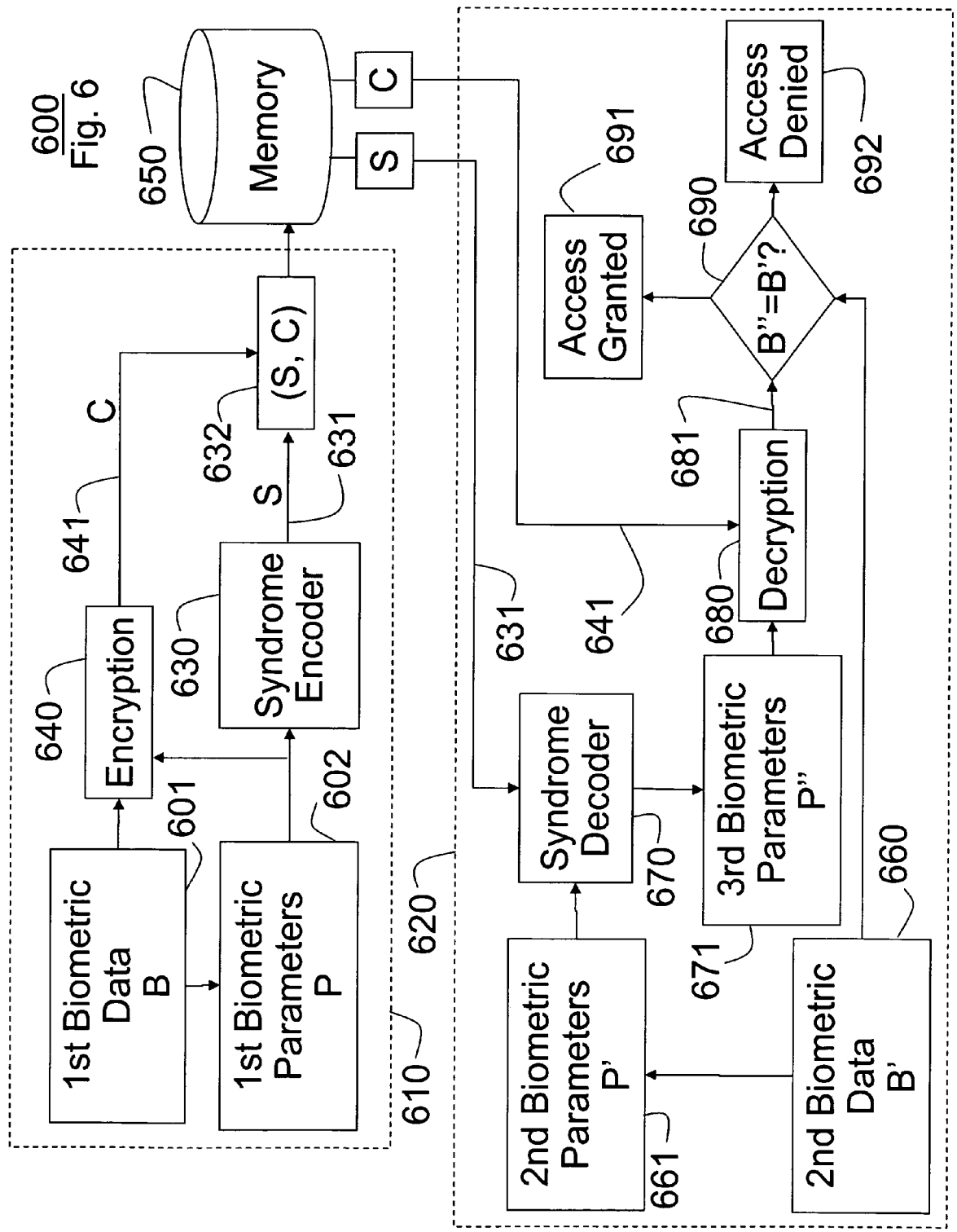
FIG. 6 is a block diagram of a biometric security system according to an embodiment of the invention.

FIG. 6 shows a method 600 for storing an encrypted version of input biometric data 601. As described above, the biometric data are derived from the raw signal used to measure or sense biometric characteristics of a user.

In the enrollment phase 610 of an access control system, for example, first biometric data B 601 are acquired from a user. Then, a feature vector of first biometric parameters P 602 is obtained from the first biometric data B 601. The first biometric data B are encrypted 640 using the first biometric parameters P as the encryption key to produce ciphertext C 641. In addition, the first biometric parameters are syndrome encoded 630 to produce a syndrome code S 631. The associated pair (S, C) 632 is then stored in a biometric database 650.

In an authentication phase 620, authentication second biometric data B' 660 are obtained from a user. The second data are used to generate a feature vector of second biometric parameters P' 661. Then, a syndrome decoder 670 decodes the first biometric parameters to produce third biometric parameters P''' 671. The third biometric parameters are then used as a key to decrypt 680 the ciphertext C to produce third biometric data B'' 681. At this point, the authentication biometric data B' and the decoded biometric data B'' are compared by a biometric recognition method 690 to determine whether access to a particular function is granted 691 or denied 692. As before, access is granted only if the first and third biometric data are exactly identical, i.e., the first and second users are the same person.

In another variation, the comparison step can use feature vectors extracted from the biometric data. The feature vectors do not need to be same the as the biometric parameters. Furthermore, the two feature vectors that are being compared only need to be substantially the same because the verification step may use a totally different process. Thus, the feature vectors can admit a wider range in variation in the biometric data that characterize a particular user over time.

There are some advantages with the process shown in FIG. 6. The authentication system can use a conventional recognition system in step 690. In addition, the biometric parameters P and P' used by the syndrome encoder/decoder can be selected independently of parameters or feature vectors used by the biometric verification step 690. Furthermore, syndrome codes are an effective method of securely storing biometric parameters. However, the method in FIG. 6 can also be applied to other methods of securely storing biometric parameters in a way where the secure biometric storage method can use feature vectors that are independent of the biometric verification method.

Designing Optimal Syndrome Codes for Secure Biometric Parameters

In general, there is a trade-off between security and accuracy in using syndrome codes to protect biometric parameters and biometric features. Specifically, a key parameter of any syndrome code is the number of bits in the code. A syndrome code with a large number of bits conveys more information about the biometric data and makes it easier to tolerate noise and variations in the biometric data. In contrast, a smaller syndrome code gives less information to an adversary but is more prone to error.

At one extreme, when the length of the syndrome code is substantially the same as the length of the underlying biometric data, any amount of noise can be tolerated because the original biometric data can be exactly recovered from only the syndrome code. Of course, in this case, an adversary who obtains the syndrome code can possibly also recover the biometric data, compromising the security of the system.

At the other extreme, a syndrome code of a very small number of bits provides extremely good security in the sense that the adversary cannot recover the biometric data from the syndrome code. However, in this case, permissible variations between the enrollment biometric data and the authentication biometric data are limited.

Obviously, a syndrome based encoder and decoder should select a length for the syndrome code that balances security and toleration of biometric variations. However, a carefully designed syndrome code can improve error resiliency.

Figure 12:
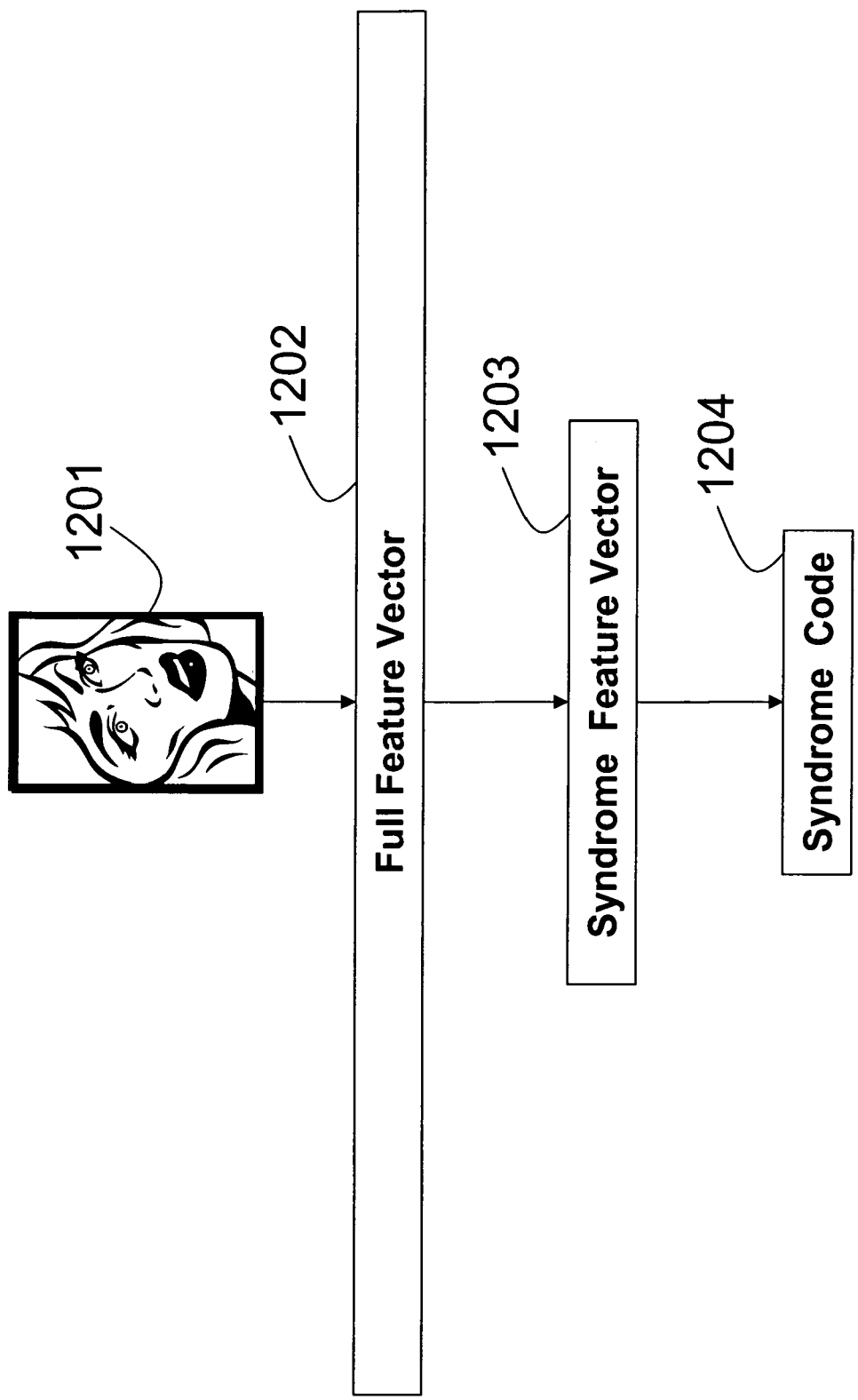
FIG. 12 is a block diagram of a design of a syndrome code according to an embodiment of the invention.

The design of the syndrome code is described with the following terminology as shown in FIG. 12. The design begins with biometric data 1201, e.g., an image of a face. A full feature vector 1202 is extracted from the biometric data. The full feature vector 1202 is reduced down to a syndrome feature vector 1203, and the syndrome feature vector is used to design an optimal syndrome code 1204.

Figure 7:
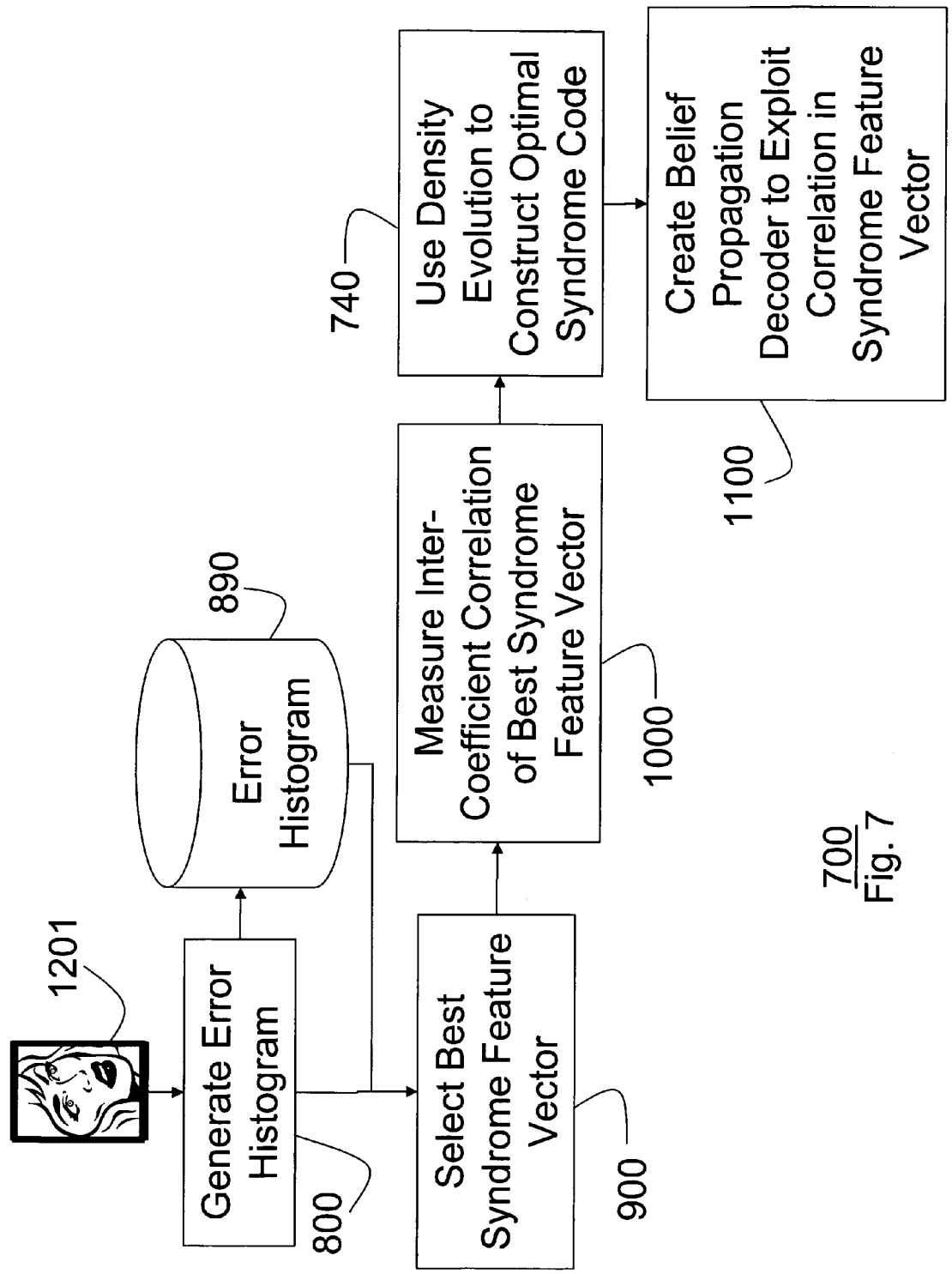
FIG. 7 is a block diagram of a process for constructing a syndrome code according to an embodiment of the invention.

FIG. 7 shows a process 700 for constructing an optimal syndrome code. Training biometric data 1201 are acquired. The biometric data are used to generate 800 an error histogram 890. The error histogram is used to select 900 a feature vector for the syndrome code. In this context, we use the term "full feature vector" 1202 to denote all biometric parameters, and the term "syndrome feature vector" 1203 to refer to a subset of the full feature vector. The syndrome feature vector can be transformed into a different feature space.

After the syndrome feature vector 1203 is selected, we measure 1000 a correlation between different coefficients of the syndrome feature vector. By using the error statistics for the syndrome feature vector and the inter-coefficient correlation, we then apply density evolution 740 to search for a degree distribution that yields an optimal syndrome code 1204 of a given length. After the syndrome feature vector and syndrome code have been selected, we construct 1100 a belief propagation decoder that exploits the inter-coefficient correlation.

Before describing each component of FIG. 7 in greater detail, we also define the following terminology. We use the term 'hard' feature vector to refer to a quantized version of a feature vector, and the term 'soft' feature vector to refer to either an unquantized or more finely quantized version of the feature vector than the 'hard' feature vector. Quantization is used because some biometric parameters can include integers and real numbers over a large numeric range. Encryption, key generation, and other authentication processes work best with integers over a small range.

The reason that we distinguish between a 'hard' feature vector and a 'soft' feature vector is that a syndrome code is formed from a 'hard' feature vector. Therefore, the 'hard' feature vector is usually quantized. In contrast, in the authentication phase, the syndrome decoder combines a 'soft' feature vector with the syndrome code to decode the 'hard' feature vector. Therefore the 'soft' feature vector does not need to be quantized or may be quantized differently to improve the error resiliency of the system.

In general, there can be multiple ways to extract a full feature vector from biometric data, as well as multiple ways to extract 'hard' and 'soft' feature vectors from the full feature vector. In such cases, we apply the process of FIG. 7 to each possibility and select the feature vector that yields the best overall results during training.

Constructing an Error Histogram

Figure 8:
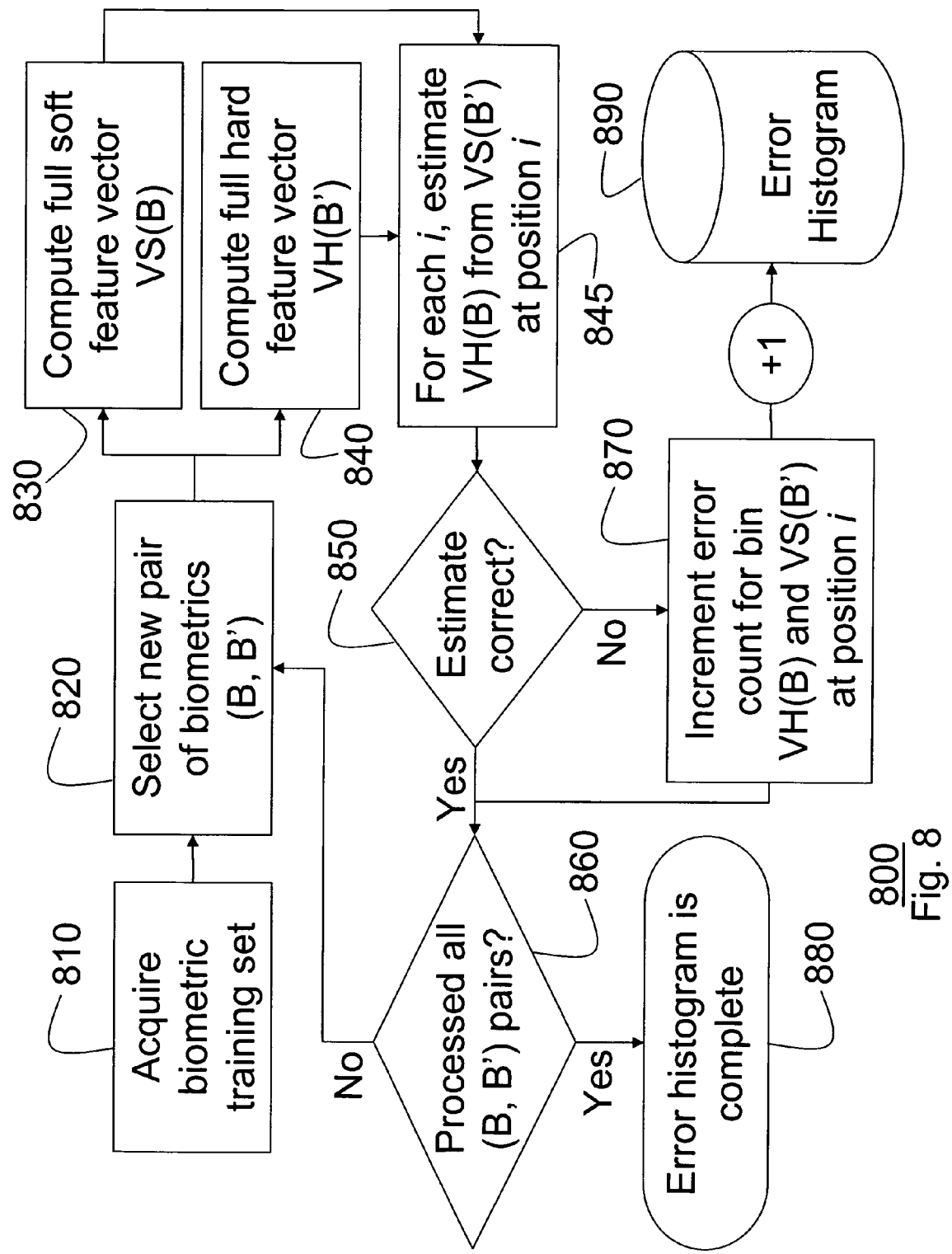
FIG. 8 is a block diagram of a process for generating a histogram according to an embodiment of the invention.

FIG. 8 shows a process 800 for generating an error histogram 890. First, we acquire 810 the training biometric data for a particular user taken on different occasions. Next, we select 820 a pair of biometric parameters, B and B', and determine a full 'soft' feature vector VS(B) 830 and the full 'hard' feature vector VH(B') 840. Then, for each position or dimension i in the full feature vector, we estimate 845 the value of VH(B') at the corresponding position i from VS(B) at position i, and determine 850 if the estimate is correct. If the estimate is incorrect, then we increment 870 a bin for the corresponding values of VH(B') and VS(B) at position i in the error histogram 890. After completing this process for each position i, we check 860 if all pairs of biometrics B and B' have been processed. If not, we return to step 820 and select another pair of biometric parameters. If all pairs have already been processed, then the error histogram is complete and the process terminates 880.

Selecting an Syndrome Feature Vector

Figure 9:
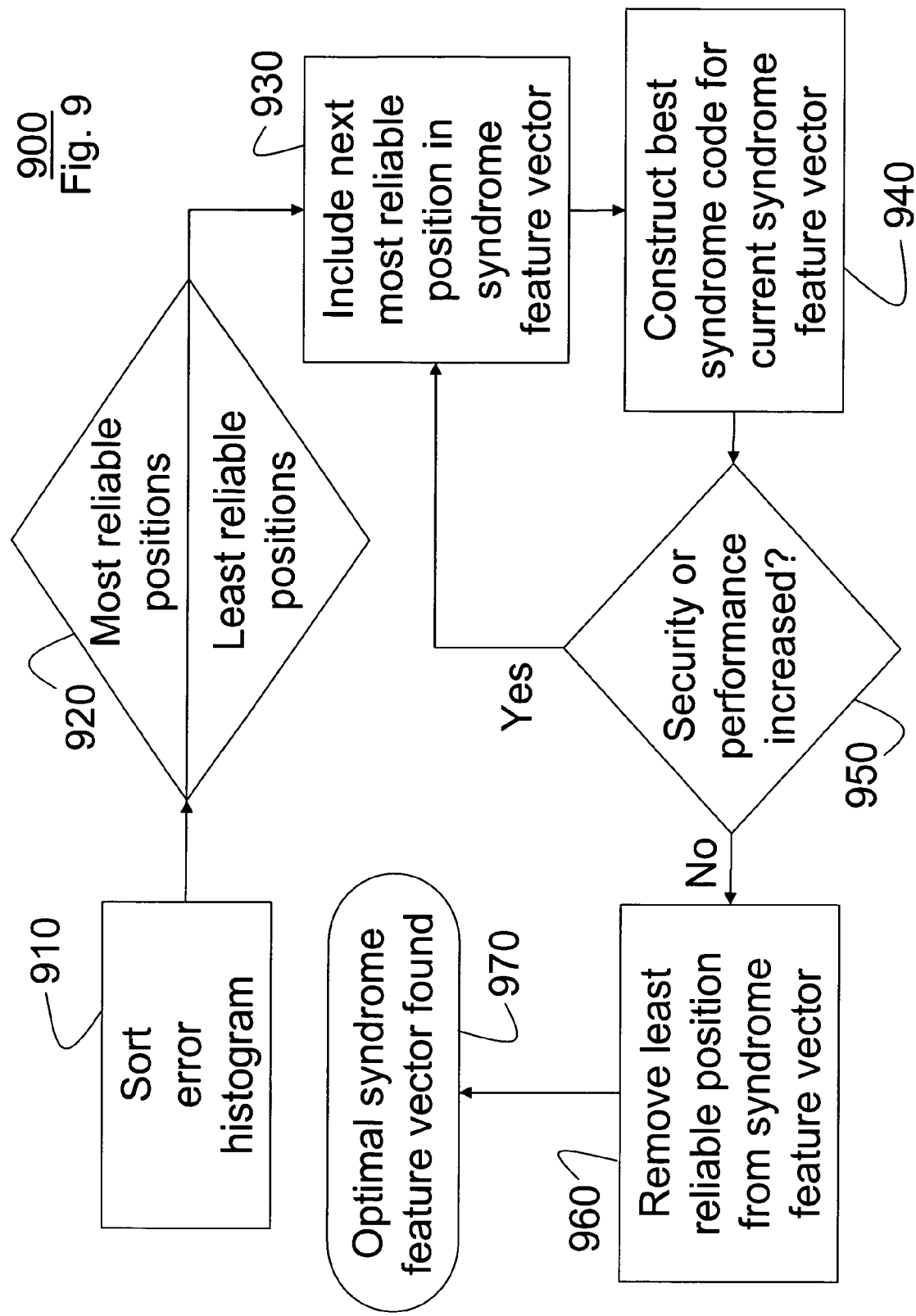
FIG. 9 is a block diagram of a process for selecting a feature vector according to an embodiment of the invention.

FIG. 9 shows a process 900 for selecting a feature vector with the aid of the error histogram of FIG. 8. First, the error histogram is sorted 910 from most reliable to least reliable positions 920. Specifically, if E(i) is an average error in predicting position i of VH(B') from position i of VS(B), then position i is considered more reliable than position j when E(i)<E(j). After the error histogram is sorted, we include 930 the next most reliable position from the error histogram in the syndrome feature vector, construct 940 the best syndrome code for the current syndrome feature vector, and test 950 whether including the most recent position increases security or error resiliency. If security or error resiliency is increased, then we continue adding additional positions to the syndrome feature vector. Otherwise, we remove 960 the most recently added position from the feature vector and we terminate 970 the process.

If it is desired to specify the level of security and optimize error resilience, then the following steps can be used for steps 940 and 950: First, in step 940, a new syndrome code with length N corresponding to the number of positions currently in the feature vector is constructed by generating a low density parity check (LDPC) code with S syndromes from a fixed degree distribution. In this case, the level of security is held constant by fixing the quantity N−S, and keeping it constant throughout the process. Then, a random biometric sample of biometric data is selected from the database, mapped to a syndrome code by applying the parity check matrix of the LDPC code, and the resulting syndrome code is decoded using belief propagation applied to another random biometric sample from the same user. Repeating this many times yields an estimate of the error resilience of the syndrome code for the given feature vector. Alternatively, if more computational complexity is tolerable in the design process, then a density evolution process discussed in "Design of capacity-approaching irregular low-density parity-check codes" by Richardson et al. in IEEE Transactions on Information Theory, vol. 47, issue 2, pp. 619-637, Feb. 2001, incorporated herein by reference, can be used to optimize the degree distribution for the code as well as to estimate the error probability more accurately.

If it is desired to specify the level of error resiliency and obtain the best security, the following steps can be used for steps 940 and 950: First, in step 940 a new syndrome code with length N corresponding to the number of positions currently in the feature vector is designed using density evolution. Specifically, a sequence of different rate codes are constructed using the density evolution, until the highest rate code is found that meets the specified-level of error resiliency as evaluated by the density evolution.

We refer to the feature vector selected by this process as the "syndrome feature vector" because it is a feature vector designed specifically for the syndrome code. We note that this feature vector can have different properties than other types of feature vectors constructed for biometric recognition, such as face or object recognition.

Measuring Inter-Coefficient Correlation

After the syndrome feature vector has been selected, the next step is to measure an inter-coefficient correlation. This information cannot be extracted from the error histogram generated according to FIG. 7 because that error histogram was generated for the full feature vector 1202, while step 900 selects only a subset of the positions in the full feature vector to produce the syndrome feature vector 1203.

Figure 10:
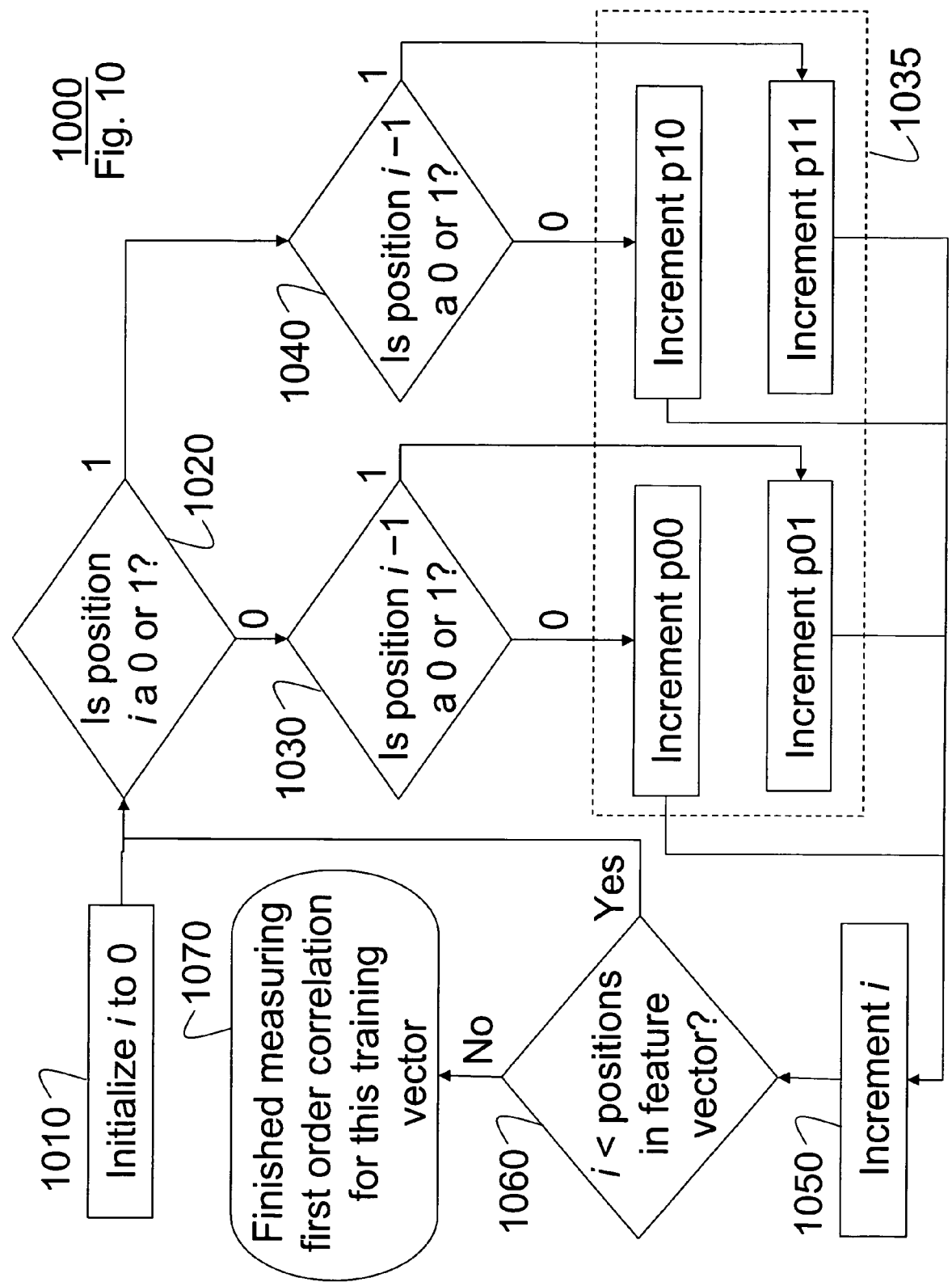
FIG. 10 is a block diagram for measuring inter-coefficient correlation according to an embodiment of the invention.

FIG. 10 shows a process 1000 for measuring a first-order correlation in a binary syndrome feature vector. This process can also be applied to non-binary feature vectors or higher order correlations. First, an element from the biometric training data set is selected and a syndrome feature vector is extracted from the element. Then, a counter variable i is initialized 1010 to zero. Next, we test 1020 if position i is 0 or 1 and proceed to step 1030 in the former case and step 1040 in the latter. Then, we test 1030 if position i−1, i.e., the previous position, was 0 or 1, and increment 1035 the appropriate bin in the histogram. Intuitively, bin p00 counts the occurrences of a 0 followed by a 0, and bin p01 counts the occurrences of a 0 followed by a 1, and so forth. Next, we increment 1050 the counter i, test 1060 if more positions remain in the syndrome feature vector, and we repeat the process for the next position. Otherwise, if we have already processed each position then we terminate 1070 the process.

After the process in FIG. 10 is performed for each element in the biometric training set, we divide the values of the bins p00, p01, p10, and p11 by the size of the biometric training set to measure the first order correlation of the syndrome feature vector.

Using Density Evolution to Construct an Optimal Syndrome Code

After the syndrome feature vector 1203 has been selected and the inter-coefficient correlation has been measured, we then design the syndrome code 1204 using density evolution. Specifically, for an LDPC syndrome code, we design the degree distribution for the syndrome code. Such a design is desired for two reasons. First, the initial syndrome code designed in step 900 can have used a fixed degree distribution selected before the syndrome feature vector 1203 was selected. Second, the initial syndrome code did not use knowledge of the inter-coefficient correlation because this correlation could only be measured after the syndrome feature vector was selected.

To actually construct the optimal degree distribution, we apply the density evolution technique to produce several candidate degree distributions.

However, conventional density evolution processes as known in the art do not take into account inter-coefficient correlation. Therefore, while the candidate degree distributions produced by the density evolution may be adequate for the case of no inter-coefficient correlation, they will generally perform differently when inter-coefficient correlation is present.

In order to obtain the best degree distribution for the syndrome code, we compare the candidate degree distributions obtained by the density evolution on the biometric training data set and select the degree distribution that performs best. In alternative embodiments, we modify the conventional density evolution algorithm to take into account the inter-coefficient correlation.

Constructing a Belief Propagation Decoder for the Syndrome Code

The final step in designing a syndrome code is to construct the associated belief propagation syndrome decoder. Belief propagation decoders for applications without inter-coefficient correlation are known. However, conventional decoders are not designed to address inter-coefficient correlation. Specifically, conventional belief propagation methods pass "messages" from variable nodes to check nodes and back again using sum-product formulas as described in "Factor graphs and the sum-product algorithm," by Kschischang et al. in IEEE Transactions on Information Theory, vol. 47, issue 2, pp. 498-519, Feb. 2001, incorporated herein by reference.

Figure 11:
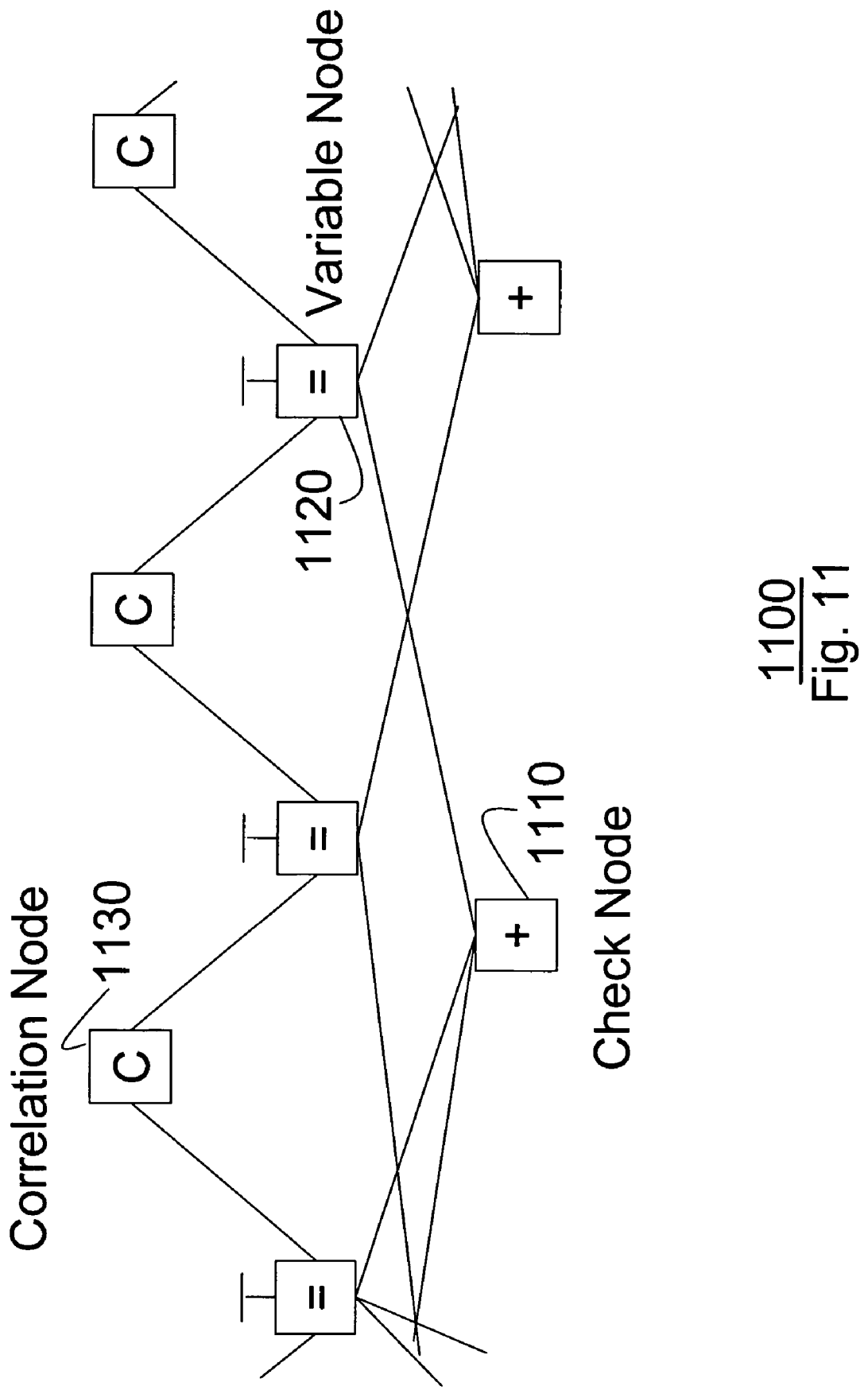
FIG. 11 is a belief propagation factor graph with correlation nodes according to an embodiment of the invention.

As shown in FIG. 11, our construction 1100 of the belief propagation factor graph includes a correlation node 1130 in addition to the conventional check node 1110 and variable node 1120. Specifically, the correlation node is added between each pair of consecutive variable nodes. The method for passing a message from the variable node to adjacent check nodes is modified to include an additional message from each adjacent correlation factor node that is multiplied with the other messages.

Specifically, using the notation of Kschischang et al., if $\mu_{y \to f}(x)$ is the incoming message for state x to variable node y from check $f$, and L(x) is the incoming message from the correlation node on the left, then the outgoing message from the variable node to the correlation node on the right is $$L(x) \cdot \Pi \mu_{y \to f}(x),$$

while the outgoing message to the correlation node on the left is $$R(x) \cdot \Pi \mu_{y \to f}(x),$$

where R(x) is the incoming message from the correlation node on the right.

We also describe a method for passing a message to and from the correlation nodes according to an embodiment of our invention. Specifically, we describe the procedure for determining the messages L(x) and R(x). If $\mu(0)$ is the incoming message to a correlation node on the left, then the outgoing message on the right side of the correlation node, which is the incoming message to the variable node to the right of the correlation node, is $$L(0) = p00 \cdot \mu(0) + p10 \cdot \mu(1)$$

and $$L(1) = p10 \cdot \mu(0) + p11 \cdot \mu(1),$$

where the p00, p01, p10, and p11 terms are the first order correlation values measured as shown in FIG. 10.

Similarly, the outgoing message on the left side of the correlation node, which is the incoming message to the variable node on the left of the correlation node, is $$R(0) = p00 \cdot \mu(0) + p01 \cdot \mu(1)$$

and $$R(1) = p01 \cdot \mu(0) + p11 \cdot \mu(1).$$

Syndrome Code Design for Iris Biometric parameters

Next, we describe how we apply the above procedure to the specific case of iris biometric parameters. We select the full 'hard' feature vector to be the sequence of bits extracted from a set of Gabor filters as described in "How iris recognition works," by J. Daugman in IEEE Transactions on Circuits and Systems for Video Technology, vol. 14, issue 1, pp. 21-30, Jan. 2004, incorporated herein by reference.

While the full 'hard' feature vector is binary, we select the full 'soft' feature vector to be quaternary. Specifically, we select the value of the full 'soft' feature vector at position i to be the best guess of what that position should be in the 'hard' feature vector, and we further append a bit indicating a reliability level. Specifically, we append a bit indicating whether we were confident or not-confident in the decision for that position.

For example, features for some positions of the 'hard' feature vector may be difficult to predict, e.g., because the features are covered by the eyelid or eyelashes, and these positions should receive the "not-confident" reliability value.

Next, we use the biometric training data to generate the error histogram as described above for FIG. 8, and then apply the feature vector design method of FIG. 9. While the full feature vector has a length of about 10,000, we discovered that features associated with many positions are not reliable. For example, the components of the feature vector corresponding to the top of the eye are often covered by the eyelid or eyelashes. After the least useful positions are discarded by the procedure of FIG. 9, we are left with the roughly 2,000 most reliable positions of in the syndrome feature vector.

If we stop at this point, step 900 in FIG. 7, the resulting syndrome code will not be error resilient to tolerate the natural variation in iris biometric parameters for a single user. Specifically, the syndrome code for a user's iris taken on one day combined with another biometric from the same iris taken on a different day fails to decode about 12% of the time. This justifies the need for the remaining steps in FIG. 7.

After we measure the first-order correlation using the procedure in FIG. 10, we detect that a bit in the 'hard' syndrome feature vector was about twice as likely to take the same value as an adjacent bit as it was to take the opposite value of the adjacent bit. We then continue with step 740 in FIG. 7 to construct optimized syndrome codes using density evolution to exploit the high correlation. Finally, we follow step 1100 to construct a belief propagation decoder to take into account the high first-order correlation.

Following these steps yields syndrome codes that are more than an order of magnitude more reliable than our initial codes, thus demonstrating the advantage of following the entire procedure in FIG. 7.

Effect of the Invention

The invention achieves secure user authentication based on biometric parameters. The invention is secure because syndrome codes are stored instead of original biometric data. This prevents an adversary who gains access to the database from learning the underlying biometric data.

It is possible to bound a best possible estimate of original biometric parameters E, which an adversary can make using only the syndrome code S, using conventional tools from the well known problem of multiple descriptions, e.g., see V. K. Goyal, "Multiple description coding: compression meets the network," IEEE Signal Processing Magazine, vol. 18, pp. 74-93, Sep. 2001. Furthermore, it is possible to develop these bounds whether a quality of the estimate is measured via absolute error, squared error, weighted error measures, or any arbitrary error function. In contrast, all prior art methods are based on binary values. There, security depends on the Hamming distance.

Essentially, the security of the syndrome code S is due to the fact that it is a compressed version of the original biometric parameter E. Furthermore, this compressed representation corresponds to the "least significant bits" of E. Using well known tools from data compression theory, it is possible to prove that if a syndrome code with a high compression is used, then these least significant bits can at best yield a poor estimate of the original parameters E, for example, see Effros "Distortion-rate bounds for fixed- and variable-rate multi-resolution source codes," IEEE Transactions on Information Theory, vol. 45, pp. 1887-1910, Sep. 1999, and Steinberg and Merhav, "On successive refinement for the Wyner-Ziv problem," IEEE Transactions on Information Theory, vol. 50, pp. 1636-1654, Aug. 2004.

Second, the invention is secure because forgery is at least as difficult as finding a collision in the underlying hash function.

In particular, the system only accepts a syndrome pair (S, H) in the authentication phase if the hash H' of the decoded biometric E" matches the original hash H. For cryptographic hash functions, such as MD5, finding an element E", which differs from E but has a hash that matches the hash of E, is generally considered impossible. Thus, if syndrome decoding succeeds in decoding E" with the proper hash, the system can be confident that E" is in fact the same as E, and all authentication decisions are made with the original biometric parameters.

Third, the invention compresses the original biometric parameters E in producing the syndrome S. Biometric databases for many users can require large amounts of storage, especially if the biometric data question requires large amounts of data, e.g., face images or speech signals. Therefore decreasing the storage required can yield drastic improvements in both cost and error resiliency. In contrast, most prior art methods for the secure storage of biometric data actually increase size of the stored data due to the overhead of encryption or error correction, and therefore require more storage than insecure systems.

Fourth, the invention can apply sophisticated code construction and decoding algorithms because the invention is built on the theory of syndrome codes. In particular, the syndrome coding according to the invention facilitates the use of soft decoding using the well known Viterbi algorithm, belief propagation, and turbo decoding for both binary and multilevel code constructions. In contrast, because most prior art methods are based on binary codes, Reed-Solomon codes, and algebraic decoding, soft decoding cannot be applied effectively when the biometric data take on real values, as opposed to binary values. For example, some methods specifically require computing the XOR of the biometric data with a random codeword in the enrollment phase to produce the reference and require computing the XOR of the reference with the biometric data in the authentication phase.

Fifth, while most prior art on secure biometrics using error correction encoding, the invention uses syndrome encoding. The computational complexity of error correction encoding is usually superlinear in the input size. In contrast, by using various types of low density parity checks based syndrome codes, it is easy to construct syndrome encoders where the computational complexity of the syndrome encoding is only linear in the input size.

Sixth, by using the syndrome coding framework, it is possible to use powerful new embedded syndrome codes as the SCA codes described by Yedidia et al. These codes allow the syndrome encoder, during enrollment, to estimate an inherent variability of biometric data, and encode just enough syndrome bits to allow successful syndrome decoding.

Seventh, the syndrome codes as describe above can be used to encrypt data. Furthermore, methods are described to enable the design for an optimal syndrome code with a given level of performance and error resiliency.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A computer implemented method for storing data in a computer readable media, comprising the steps of:
    acquiring first biometric data from a first user;
    generating first biometric parameters from the first biometric data;
    encrypting the first biometric data using the first biometric parameters to produce ciphertext;
    encoding the first biometric parameters using a syndrome encoder to produce a syndrome code, wherein the encoding further comprises;
        extracting a full feature vector from the first biometric data;
        constructing an error histogram from the full feature vector;
        reducing the full feature vector to a syndrome feature vector using the error histogram;
        measuring a correlation between different coefficients of the syndrome feature vector; and
        applying density evolution to design the syndrome code for the syndrome feature vector;
    associating the ciphertext and the syndrome code; and
    storing the ciphertext and the syndrome code in a computer readable media.

2. The method of claim 1, further comprising:
    acquiring second biometric data from a second user;
    generating second biometric parameters from the second biometric data;
    decoding the first biometric parameters using a syndrome decoder and the second biometric parameters to produce third biometric parameters; and
    decrypting the ciphertext using the third biometric parameters to produce third biometric data.

3. The method of claim 2, further comprising:
    comparing the first biometric data and the third biometric data; and
    granting access to a function only if the first and second biometric data are identical, and denying access otherwise.

4. A computer implemented method for storing data in a computer readable media, comprising the steps of:
    acquiring first biometric parameters from a first user;
    encrypting input data according to the first biometric parameters to produce ciphertext;
    encoding the first biometric parameters using a syndrome encoder to produce a syndrome code, wherein the encoding further comprises;
        extracting a full feature vector from the first biometric data;
        constructing an error histogram from the full feature vector;
        reducing the full feature vector to a syndrome feature vector using the error histogram;
        measuring a correlation between different coefficients of the syndrome feature vector; and
        applying density evolution to design the syndrome code for the syndrome feature vector;
    associating the ciphertext and the syndrome code; and
    storing the ciphertext and the syndrome code in a computer readable media.

5. The method of claim 4, further comprising:
    acquiring second biometric parameters from a second user;
    decoding the first biometric parameters using a syndrome decoder and the second biometric parameters to produce third biometric parameters; and
    decrypting the ciphertext using the third biometric parameters to produce output data.

6. The method of claim 5, in which the input data and the output data are exactly the same only if the first user is identical to the second user.

7. The method of claim 4, in which the input data are biometric data.

8. The method of claim 5 further comprising:

extracting a first feature vector from the first biometric data;

extracting a second feature vector from the third biometric data;

comparing the first feature vector and the second feature vector; and granting access to a function only if the first and second feature vectors are substantially the same, and denying access otherwise.

9. The method of claim 8 in which the first and third biometric parameters are different than the first and second feature vectors, respectively.

10. The method of claim 1 in which the full feature vector includes a full hard feature vector storing only integer numbers, and a full soft feature vector storing integer and real numbers.

11. The method of claim 4, in which the syndrome decoder uses a belief propagation network.

12. The method of claim 11, in which the belief propagation network includes check nodes and variable nodes, and a correlation node between each pair of variable nodes.

13. A computer implemented method for storing data in a computer readable media, comprising the steps of:

acquiring biometric data from a user;

generating an encryption key from the biometric data;

encrypting data according to the encryption key to produce ciphertext;

encoding the encryption key as an encoded key, wherein the encoding further comprises;

extracting a full feature vector from the first biometric data;

constructing an error histogram from the full feature vector;

reducing the full feature vector to a syndrome feature vector using the error histogram;

measuring a correlation between different coefficients of the syndrome feature vector; and applying density evolution to design the syndrome code for the syndrome feature vector; and storing the encoded key in association with the ciphertext in computer readable media.

14. The method of claim 13, further comprising:

reacquiring subsequently biometric data from the user;

generating a decoding key from the reacquired biometric data;

decoding the encoded key with the decoding key; and decrypting the ciphertext with the decoding key only if the decoding key matches the encryption key.

* * * * *